UNITED STATES PATENT OFFICE.

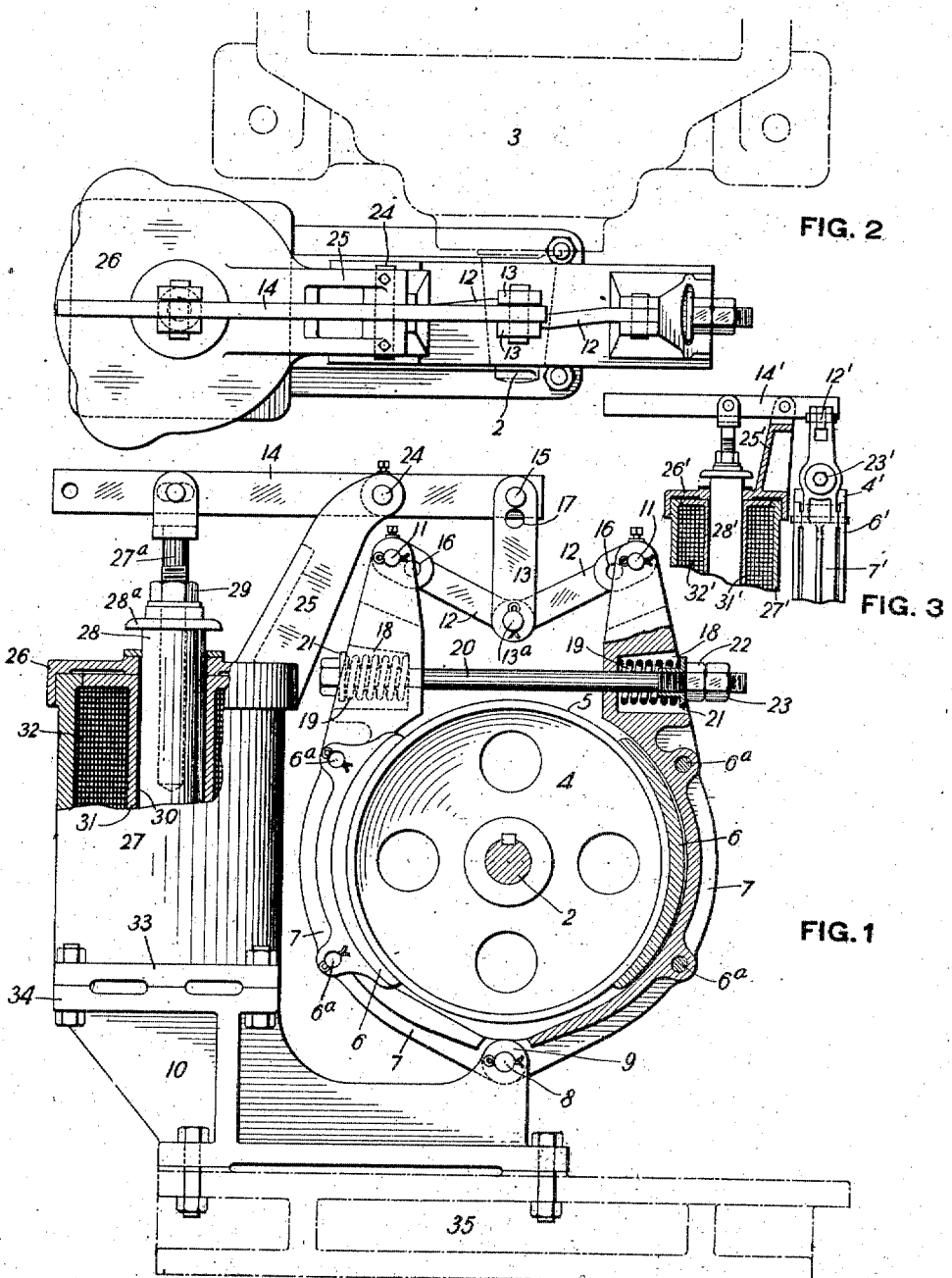

EUGENE FRIEDLAENDER, OF BRADDOCK, PENNSYLVANIA, ASSIGNOR TO WESTINGHOUSE ELECTRIC & MANUFACTURING COMPANY, A CORPORATION OF PENNSYLVANIA.

BRAKE MECHANISM.

1,231,590. Specification of Letters Patent. Patented July 3, 1917.

Application filed October 11, 1912. Serial No. 725,241.

*To all whom it may concern:*

Be it known that I, EUGENE FRIEDLAENDER, a citizen of the United States, residing at Braddock, in the county of Allegheny and State of Pennsylvania, have invented a new and useful Brake Mechanism, of which the following is a specification.

My invention has relation to the class of brakes employed in connection with electric motors in stopping and controlling the operation of such motors and, while not restricted to such use, more particularly relates to the construction and arrangement of electrically operated brakes employed in stopping and controlling the operation of the armature shaft of electric motors and of similar devices ordinarily rotated when in use at a high rate of speed.

One object of my invention is to provide a brake mechanism of strong and durable construction, which is simple in design and adapted to withstand severe usage, having novel means whereby the retarding or braking power of the brake is applied and by which the brake is maintained in operative or holding position.

Another object of the invention is to provide a brake mechanism having improved means whereby the brake is released and is held in disengaged or inoperative position.

A further object of my invention is to provide a brake mechanism of novel construction having improved means whereby a uniform retarding or braking power is afforded, with the brake wheel rotating in either of opposite directions and by which the braking and brake holding power is made substantially constant during the life of the brake shoes forming part of the braking mechanism.

Still further objects of this invention will appear hereinafter as the apparatus is more fully described and claimed.

Referring to the accompanying drawings forming part of this specification Figure 1 is an elevation showing a brake mechanism constructed and arranged and applied for use in accordance with my invention. Fig. 2 is a plan of the apparatus shown in Fig. 1.

Fig. 3 is a sectional elevation on a slightly smaller scale showing a portion of a modified form of brake mechanism as constructed and arranged and applied for use in accordance with this invention.

In the drawings, in which my improved brake mechanism is shown applied for use with an electric motor, the numeral 2 designates the armature shaft of a motor 3 which may form part of an electric crane, an elevator or hoist operating mechanism or may comprise part of the driving mechanism of a roller feed table or similar apparatus, wherein it is necessary or desirable to bring the motor to a stop quickly after shutting off the current, or in which the armature of the motor is to be held against rotation as in cases of sustained loads on such cranes, elevators, hoists and like devices.

Keyed or otherwie secured on the shaft 2 so as to rotate therewith is a brake wheel 4 having a flat periphery 5 which is arranged to be engaged by the opposed brake shoes 6, 6 and, preferably, the shoes 6 are removably secured on the curved or bent arms 7, 7 which are pivotally secured at one end by the pin 8 to lugs 9 on the support or base 10 for the solenoid by which the brake mechanism (as will hereinafter be described) is moved and held in inoperative position.

The upper ends of the arms 7 are pivotally connected by pins 11 to one end of the toggle links 12, 12 and the adjacent overlapping ends of these links 12 are connected by a pin 13ª to one end of the links 13, 13 which are pivotally connected to one end of the lever 14 by the pin 15.

Provision is made for considerable wear upon the brake shoes 6 before necessitating their removal and replacement by means of the extra inner set of holes 16 in the toggle links and holes 17 in the links 13.

At an intermediate point in the length of the pivoted arms 7 are recesses 18 in which the helical springs 19 are mounted and a rod 20 having a screw-threaded end extends through the recesses 18 and the followers 21, and the screw-threaded end of the rod has an adjusting nut 22 and jam nut 23 by which compression of the springs 18 is regulated and the gripping force of the brake shoes 6 on the brake wheel 4 is regulated when the brake is set or in operative or holding position.

The lever 14 which is pivotally mounted on a pin 24 in the bracket bearing 25 formed integrally on the cover 26 for the solenoid casing 27 is connected to the forked end of the plunger rod 27ª which is screwed into the internally threaded upper end of the solenoid core 28 by which the braking mechanism is actuated. A flange 28ª on the upper end of the core 28 is provided by which downward movement of the core is limited and a lock or jam nut 29 serves to hold the rod 27ª in adjusted position in the core 28.

The solenoid core 28 projects downwardly into the axial opening 30 in the spool 31 of the solenoid which as shown is constructed with a coil 32 on the spool 31, the coil 32 being entirely surrounded by the metal shell or casing 27, the bottom of which is provided with lugs or flanges 33 by which the solenoid is secured in position on the upper flanges 34 on the base 10.

The brake shoes 6 as illustrated are shown unlined, although the shoes may be lined with asbestos, which gives a considerably higher coefficient of friction with a relatively long life if an extra strong braking effect is desired, or in cases where oil or grease, which would greatly reduce the friction between the contacting metal faces of the shoes and brake wheel, is liable to get on the wheel. Such asbestos lining being affected little if any by oil or water, is particularly well adapted for such uses.

Suitable provision is made, ordinarily, on the motor base plate 35, for mounting thereon the base 10 on which the solenoid and brake mechanism are secured.

The brake operating mechanism as shown in Figs. 1 and 2 is located to one side of the armature shaft while in Fig. 3 the solenoid is positioned directly in front of or in line with the axis of the armature shaft 2.

In the construction shown in Fig. 3 the link connecting the lever 14' with the toggle links 12, 12 is modified in construction owing to the change in position of the solenoid and base therefor on the motor base plate 35 relative to the axis of the motor armature shaft.

In the operation of my improved brake mechanism, the apparatus is assembled as shown and the nuts 22, 23 on the bolt 20 are adjusted so as to compress the springs 19 to the extent necessary to clamp the shoes 6, 6 on the brake wheel 4 and hold the armature shaft 2 and wheel 4 stationary when the current is shut off from the motor 3 and the crane, hoist or elevator mechanism of which the motor forms part is carrying a load of maximum capacity.

When the motor 3 is set in operation, current is caused to pass through the coil 32 of the solenoid and when energized, the coil 32 will cause the solenoid core 28 to move downwardly within the opening 30 of the spool 31 into which it projects. The downward movement of the core 28 through the medium of the lever 14 will actuate the toggle links 12, 12 in such manner as to move the pivoted arms 7 away from each other on the pivot pin 9 by which they are connected to the base 10. This movement of the toggle links will further compress the springs 19 and the movement of the arms 7 will retract the brake shoes 6 and release the brake wheel 4 so that the armature shaft 2 will rotate freely with the brake shoes 6 out of engagement with the brake wheel 4 on the shaft 2.

When the current is shut off from the motor 3, the solenoid coil 32 is deënergized simultaneously therewith. When this occurs the compressed springs 19 act through the connecting lever mechanism to lift the solenoid core 28 and again throw the toggle links 12 into the position shown in Fig. 1 of the drawings, in which position the compressive force of the springs 19, 19 is again exerted to move the brake shoes 6 tightly into engagement with the periphery 5 of the brake wheel 4 so as to first retard and then hold the brake wheel 4 and armature shaft 2 connected therewith against rotation.

As the solenoid core 28 is of considerable weight, the force of the springs 19 is counterbalanced by the inertia of the core at the time the retarding power is first applied by the shoes 6 to the brake wheel 4 so that the retarding action of the brake shoes is cushioned and made to gradually increase which tends to lessen the liability of breakage or other accident to the apparatus.

The above described operations are then repeated as often as is necessary in the operation of the brake and when the motor is rotated in either of opposite directions.

The advantages of my invention will be apparent to those skilled in the art.

The action of the brake is entirely automatic as it is set by the springs and is released whenever the solenoid or electro-magnet is energized. The brake is amply strong to give sufficient braking power with a maximum air gap. The solenoid core can be easily raised or lowered by means of the adjustable eye bolt 27ª whenever it is desired to slacken or loosen the brake shoes.

The compressive movement of the springs is very short so that the stresses are kept low and liability of breakage of the springs is materially lessened. The weight of the solenoid core counteracts the spring pressure when the setting action of the brake shoes occurs so that the braking or retarding force is gradually applied to the brake wheel. The removable brake shoes are rigidly mounted on the pivoted brake shoe arms and are readily removed and replaced when required.

Modifications in the construction and arrangement of the parts may be made without departing from my invention.

I claim:—

1. A brake mechanism comprising a brake wheel, brake shoes operatively engaging with the wheel, arms on which said brake shoes are removably secured, means on said arms including a rod and coil spring whereby the arms are actuated to move and hold the brake shoes in engagement with said wheel, a toggle whereby said arms are actuated to move the brake shoes, a lever operatively connected to said toggle, and a solenoid having a core member adjustably secured to said lever to move the toggle and throw the brake shoes into inoperative position.

2. A brake mechanism comprising a brake wheel, brake shoes operatively engaging with said wheel, pivoted arms for said shoes, means for yieldingly holding the shoes in operative engagement with the wheel, a toggle connected to the arms to move the shoes into inoperative position, a pivoted lever connected to said toggle, a solenoid and having a core member adjustably connected to said lever to actuate the toggle and retract the brake shoes out of operative engagement with said brake wheel, and means integral with said stationary part for supporting said lever.

3. A brake mechanism comprising a brake wheel, a pivoted arm having a shoe operatively engaging with the wheel, yielding means whereby said arm is moved to bring and hold the shoe in braking engagement with the wheel, a toggle connected to said arm to release and hold the brake shoe in disengaged position, a solenoid, and a lever supported by said solenoid for operatively and adjustably connecting the solenoid to said toggle.

4. A brake mechanism comprising a brake wheel, pivoted arms having opposed shoes operatively engaging with the brake wheel, a spring whereby said arms are actuated to move and hold the shoes in braking engagement with the wheel and a solenoid operatively and adjustably connected to said arms to release and hold the shoes in disengaged position.

5. A brake mechanism comprising a brake wheel, pivoted arms having opposed brake shoes operatively engaging with the brake wheel, means whereby said arms are actuated to move and hold the shoes in braking engagement with the wheel, a solenoid comprising a casing, and a lever supported by said casing and adjustably operatively connected to said solenoid and said arms.

6. A brake mechanism comprising a brake wheel, a pivoted arm having a brake shoe operatively engaging with the brake wheel, means whereby said arm is actuated to move and hold the shoe in braking engagement with the wheel, and a solenoid operatively connected to said arm to release and hold the shoe in disengaged position, said solenoid comprising a relatively heavy core member for opposing the initial action of said actuating means.

In testimony whereof, I have hereunto set my hand.

EUGENE FRIEDLAENDER.

Witnesses:
 DAVID BLYTH,
 ROBT. DRYLIE.

Correction in Letters Patent No. 1,231,590.

It is hereby certified that in Letters Patent No. 1,231,590, granted July 3, 1917, upon the application of Eugene Friedlaender, of Braddock, Pennsylvania, for an improvement in "Brake Mechanism," an error appears in the printed specification requiring correction as follows: Page 3, line 19, claim 2, after the word "solenoid" insert the words *comprising a stationary part;* and that the said Letters Patent should be read with this correction therein that the same may conform to the record of the case in the Patent Office.

Signed and sealed this 14th day of August, A. D., 1917.

[SEAL.]

R. F. WHITEHEAD,
*Acting Commissioner of Patents.*

Cl. 74—70.